United States Patent
Ryan et al.

(10) Patent No.: US 9,063,714 B1
(45) Date of Patent: Jun. 23, 2015

(54) DETECTING STARTUP FAULT OF SDRAM VOLTAGE REGULATOR

(75) Inventors: Robert P. Ryan, Mission Viejo, CA (US); Timothy A. Ferris, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1947 days.

(21) Appl. No.: 12/144,062

(22) Filed: Jun. 23, 2008

(51) Int. Cl.
*G06F 12/00* (2006.01)
*G06F 1/26* (2006.01)

(52) U.S. Cl.
CPC ........................................ *G06F 1/26* (2013.01)

(58) Field of Classification Search
CPC ........................................................ G06F 1/22
See application file for complete search history.

(56) References Cited

U.S. PATENT DOCUMENTS

| 5,467,039 A | 11/1995 | Bae |
| 7,327,612 B2 | 2/2008 | Bacchus et al. |
| 2007/0174641 A1* | 7/2007 | Cornwell et al. ............. 713/300 |
| 2008/0101147 A1* | 5/2008 | Amidi ........................... 365/229 |

OTHER PUBLICATIONS

Micron Technical Note, "Power Solutions for DDR2 Notebook PCs", TN-47-05, Jun. 2004, pp. 1-12, http://www.micron.com.

* cited by examiner

*Primary Examiner* — Matthew Bradley
*Assistant Examiner* — Arvind Talukdar

(57) ABSTRACT

A digital device is disclosed comprising a memory, a microprocessor operable to access the memory, and a voltage regulator for ramping an output voltage supplied to the memory during a startup operation. During the startup operation, control circuitry monitors the output voltage, and when the output voltage remains above a first threshold for a predetermined interval, sets a flag. Thereafter, the voltage regulator is enabled to ramp the output voltage after the predetermined interval.

25 Claims, 7 Drawing Sheets

DETECTING STARTUP FAULT OF SDRAM VOLTAGE REGULATOR

BACKGROUND

Synchronous dynamic random access memory (SDRAM) is employed in computer systems as a very fast, volatile memory for storing user and program data. SDRAM is employed in personal computers, as well as in the peripheral devices that connect to personal computers, such as printers, disk drives, or solid state drives. Certain types of SDRAM (e.g., double data rate (DDR)) typically require a dedicated voltage regulator which provides a driving current or a sink current to the memory data bus. In addition, certain types of SDRAM (e.g., DDR2) require that the output voltage of the SDRAM voltage regulator ramp from a sufficiently low level (e.g., 0.3 volts). Otherwise, the SDRAM may fail to initialize and therefore not operate properly when accessed.

SUMMARY OF EMBODIMENT OF THE INVENTION

A digital device is disclosed comprising a memory, a microprocessor operable to access the memory, and a voltage regulator for ramping an output voltage supplied to the memory during a startup operation. During the startup operation, control circuitry monitors the output voltage, and when the output voltage remains above a first threshold for a predetermined interval, sets a flag. Thereafter, the voltage regulator is enabled to ramp the output voltage after the predetermined interval.

DETAILED DESCRIPTION OF EMBODIMENTS OF THE INVENTION

Figures 1A, 1B:
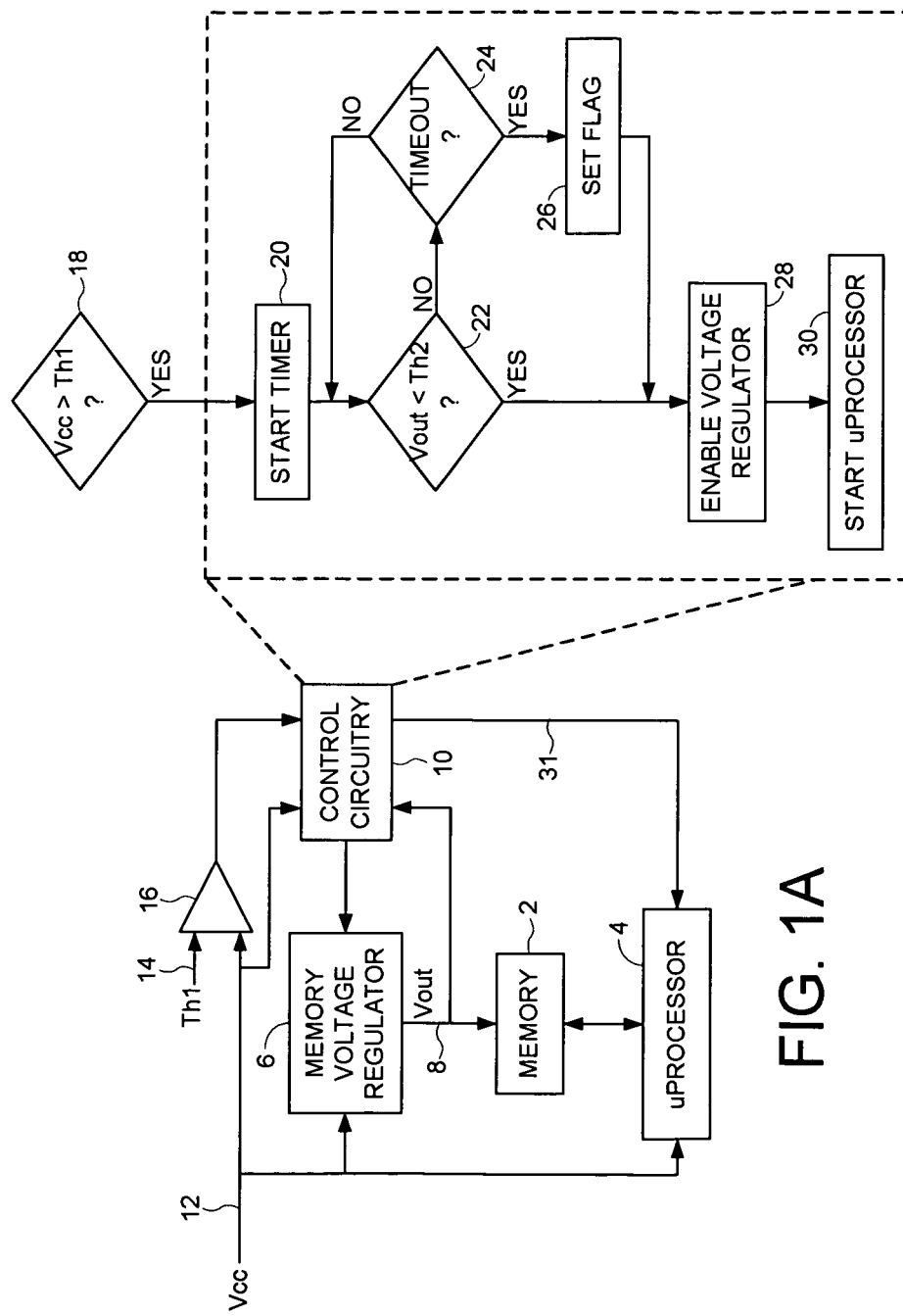
FIG. 1A shows a digital device according to an embodiment of the present invention including a memory, a microprocessor operable to access the memory, a voltage regulator for ramping an output voltage supplied to the memory during a startup operation, and control circuitry operable to startup the digital device.
FIG. 1B is a flow diagram executed by the control circuitry according to an embodiment of the present invention wherein a flag is set if the output voltage of the voltage regulator stays above a threshold for a predetermined interval during the startup operation.

FIG. 1A shows a digital device according to an embodiment of the present invention comprising a memory 2, a microprocessor 4 operable to access the memory 2, control circuitry 10, and a voltage regulator 6 for ramping an output voltage 8 supplied to the memory 2 during a startup operation. The control circuitry 10 executes the flow diagram of FIG. 1B during the startup operation, wherein after a supply voltage 12 exceeds a first threshold 14 at comparator 16 (step 18), a timer is started to time a predetermined interval (step 20). The output voltage 8 is monitored (step 22), and when the output voltage 8 remains above a first threshold for the predetermined interval (step 24), a flag is set (step 26). The voltage regulator is enabled to ramp the output voltage after the predetermined interval (step 28) and the control circuitry 10 starts the microprocessor (step 30) over control line 31.

Figure 2:
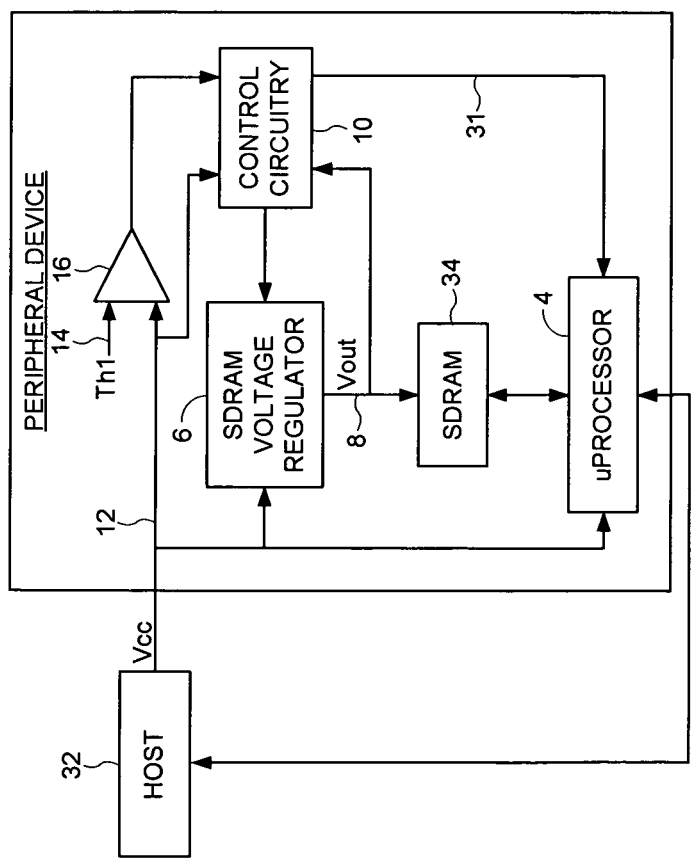
FIG. 2 shows an embodiment of the present invention wherein the digital device comprises a peripheral device.

FIG. 2 shows an embodiment of the present invention wherein a peripheral device comprises the digital device and interfaces with a host 32. The host 32 generates the supply voltage 12 applied to the peripheral device which is compared to a threshold 14 at comparator 16. When the supply voltage 12 exceeds the threshold 14, the control circuitry 10 is enabled to begin executing the startup operation as shown in the embodiment of FIG. 1B. Also in the embodiment of FIG. 2, the memory 2 of FIG. 1A comprises a synchronous dynamic random access memory (SDRAM) 34, and in one embodiment, the SDRAM 34 comprises a DDR2 SDRAM.

Figure 3:
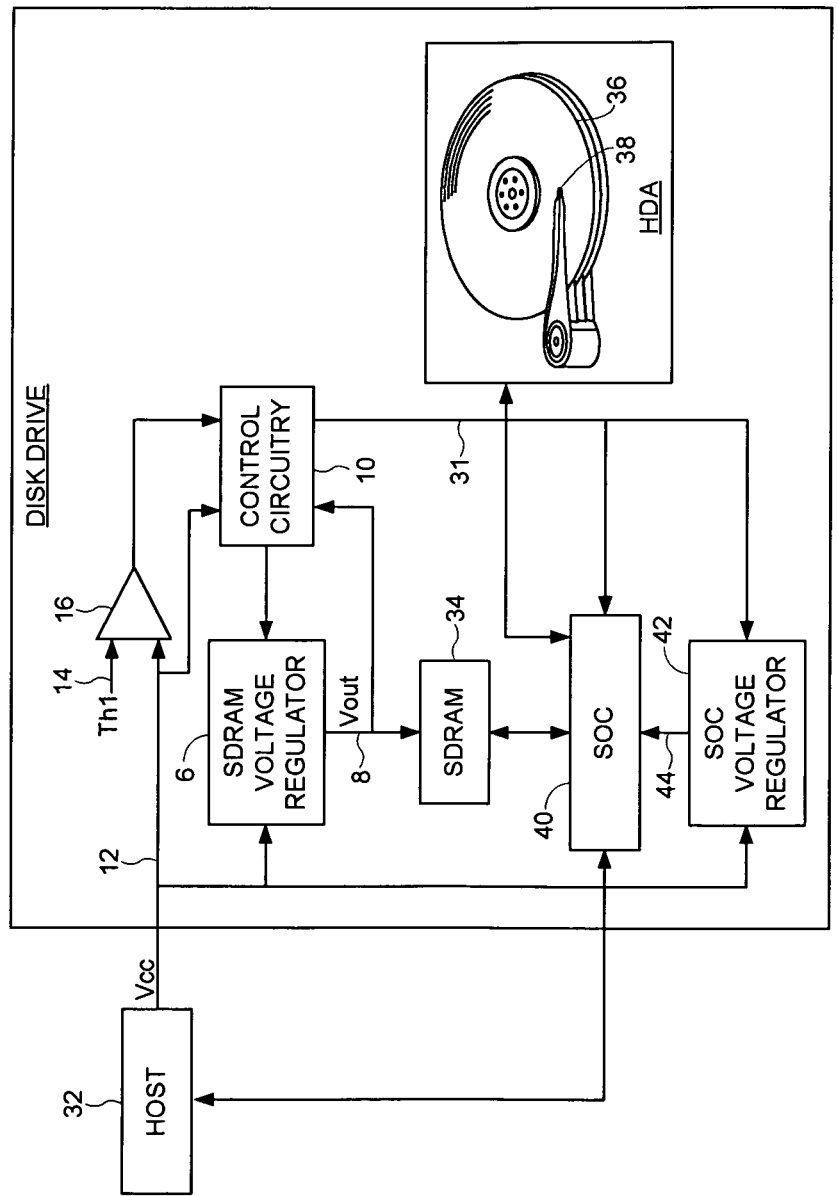
FIG. 3 shows an embodiment of the present invention wherein the digital device comprises a disk drive.

FIG. 3 shows an embodiment of the present invention wherein a disk drive comprises the digital device and includes a disk 36 and a head 38 actuated over the disk 36. The disk drive further comprises a system on a chip (SOC) 40 which comprises a microprocessor operable to access an SDRAM 34. When the supply voltage 12 exceeds the threshold 14, the control circuitry 10 is enabled to begin executing the startup operation as shown in the embodiment of FIG. 1B. Also in the embodiment of FIG. 3, the disk drive comprises a SOC voltage regulator 42 for supplying a regulated voltage 44 to the SOC 40. In one embodiment, the control circuitry 10 enables the SOC voltage regulator 42 over control line 31 after the supply voltage 12 exceeds the threshold 14 at comparator 16.

Figure 4A:
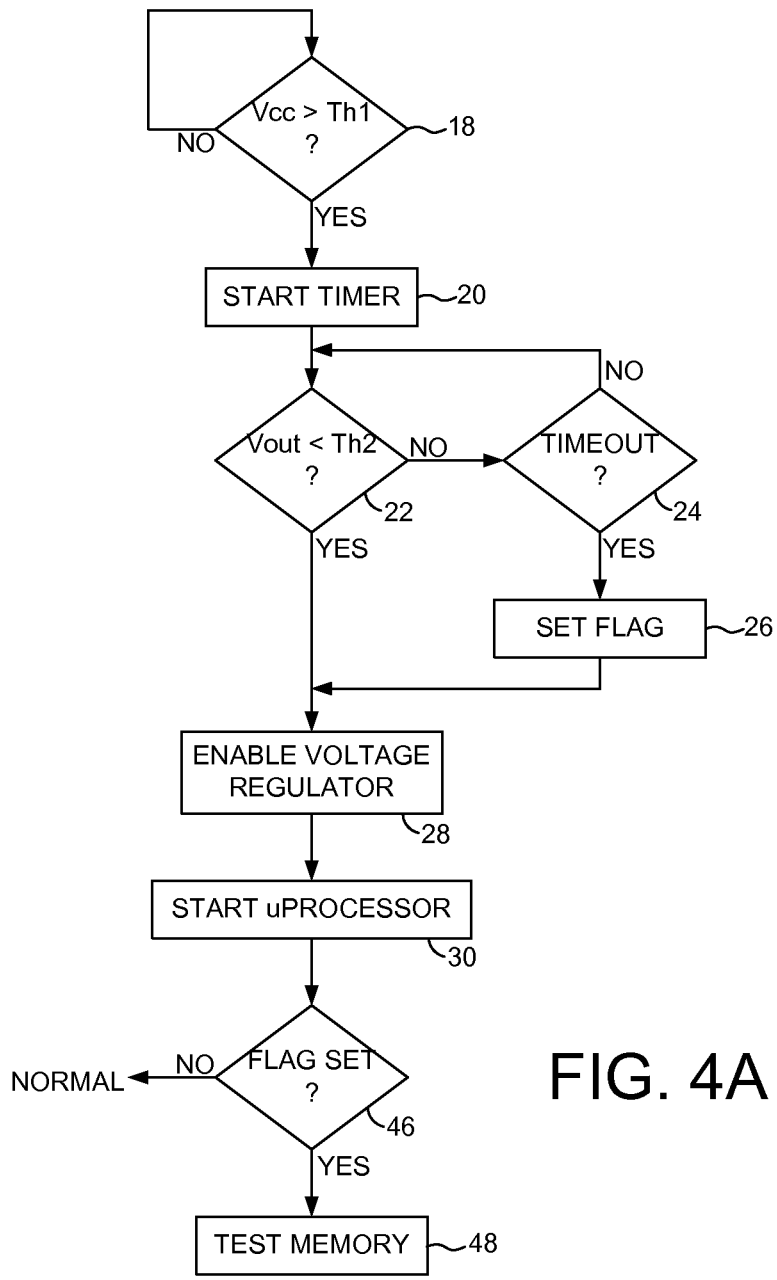
FIG. 4A is a flow diagram according to an embodiment of the present invention wherein if the flag is set after the startup operation, the microprocessor executes a test procedure to test the memory.
Figure 4B:
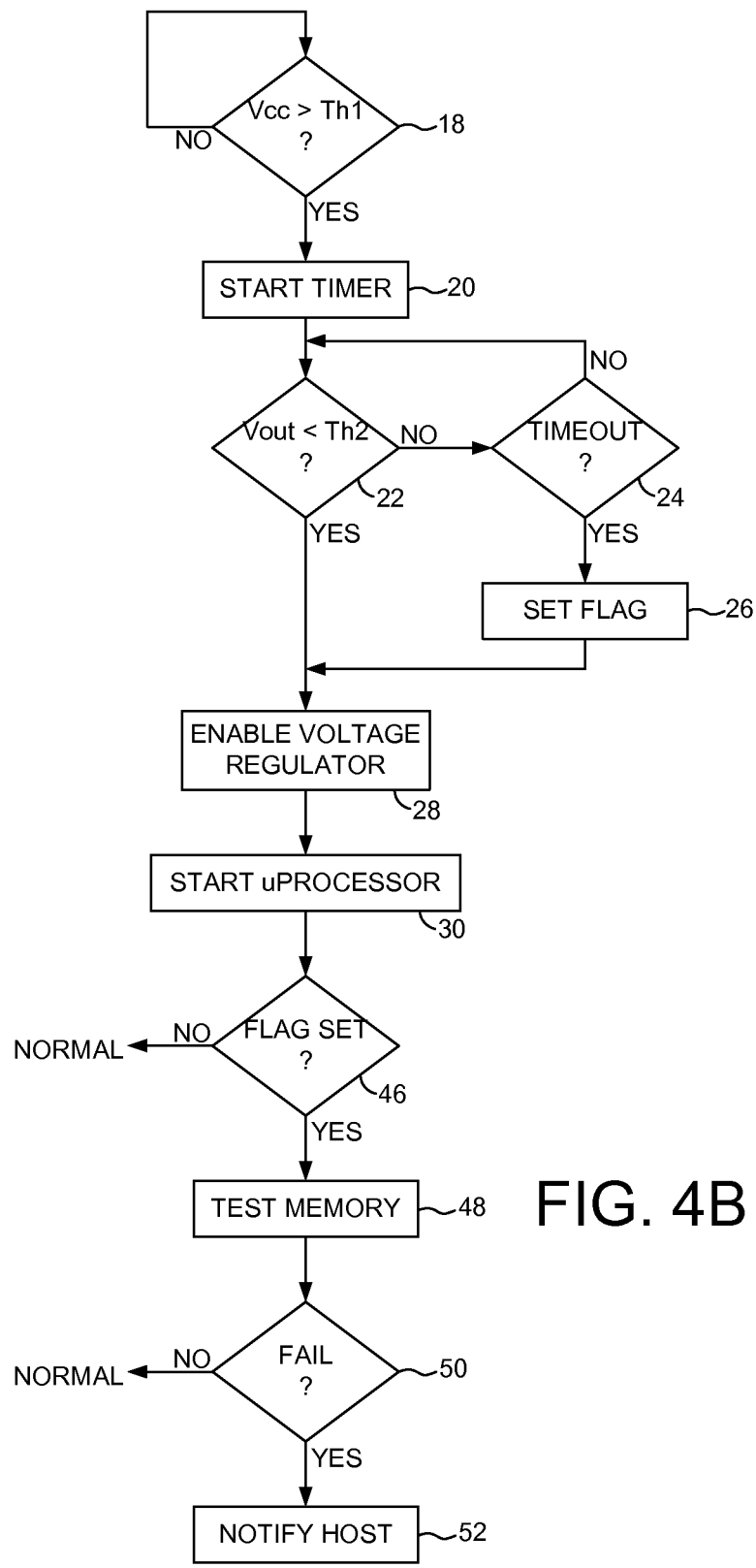
FIG. 4B is a flow diagram according to an embodiment of the present invention wherein if the test procedure for testing the memory fails, the microprocessor notifies a host.

FIG. 4A is a flow diagram according to an embodiment of the present invention which expands on the flow diagram of FIG. 1B that may be executed by control circuitry 10. After starting the microprocessor (step 30), the microprocessor detects whether the flag was set (step 46). If the flag is set, indicating that the memory may have not started normally, the microprocessor executes a test procedure in order to test the memory (step 48). For example, the microprocessor may perform a number of writes and reads to the memory to verify whether the memory is operating properly. In an embodiment shown in the flow diagram of FIG. 4B, if the memory fails the test procedure (step 50), the microprocessor notifies a host (step 52) so that the host may take appropriate action, such as resetting the digital device.

Figure 5:
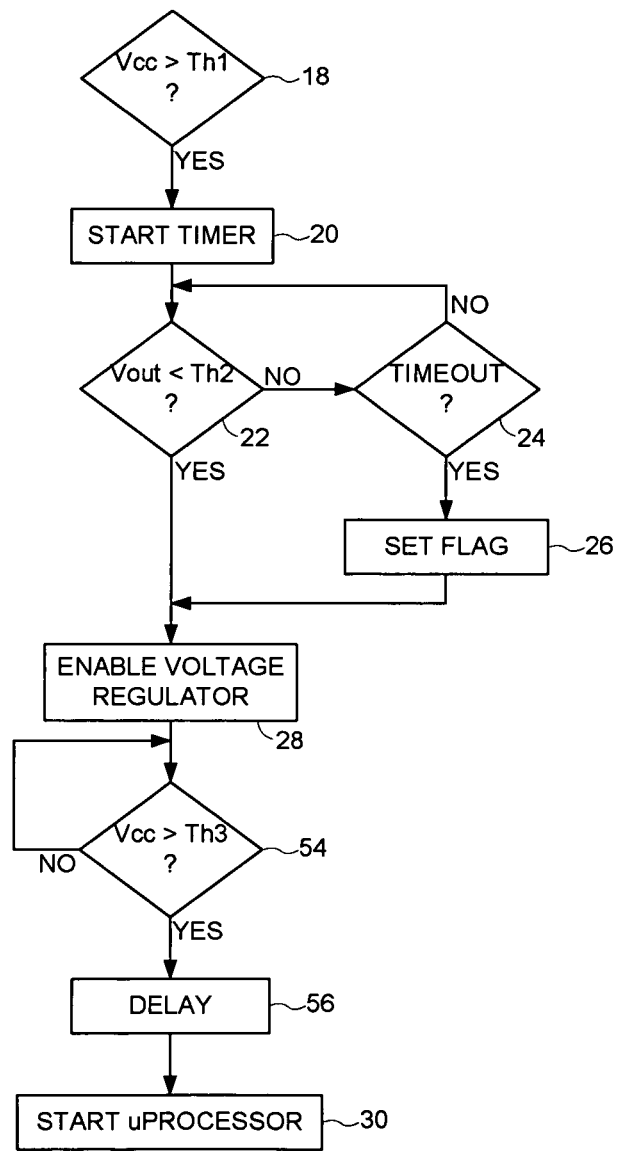
FIG. 5 is a flow diagram according to an embodiment of the present invention wherein after the voltage regulator is enabled, the microprocessor is started after a supply threshold exceeds a threshold.

FIG. 5 is a flow diagram according to an embodiment of the present invention which expands on the flow diagram of FIG. 1B that may be executed by control circuitry 10. After enabling the voltage regulator (step 28), the control circuitry waits until the supply voltage 12 rises above a third threshold (step 54), which is higher than the first threshold from step 18. The control circuitry then delays for an interval (step 56) to ensure the supply voltage 12 has stabilized, and then starts the microprocessor (step 30).

Figures 6A, 6B:
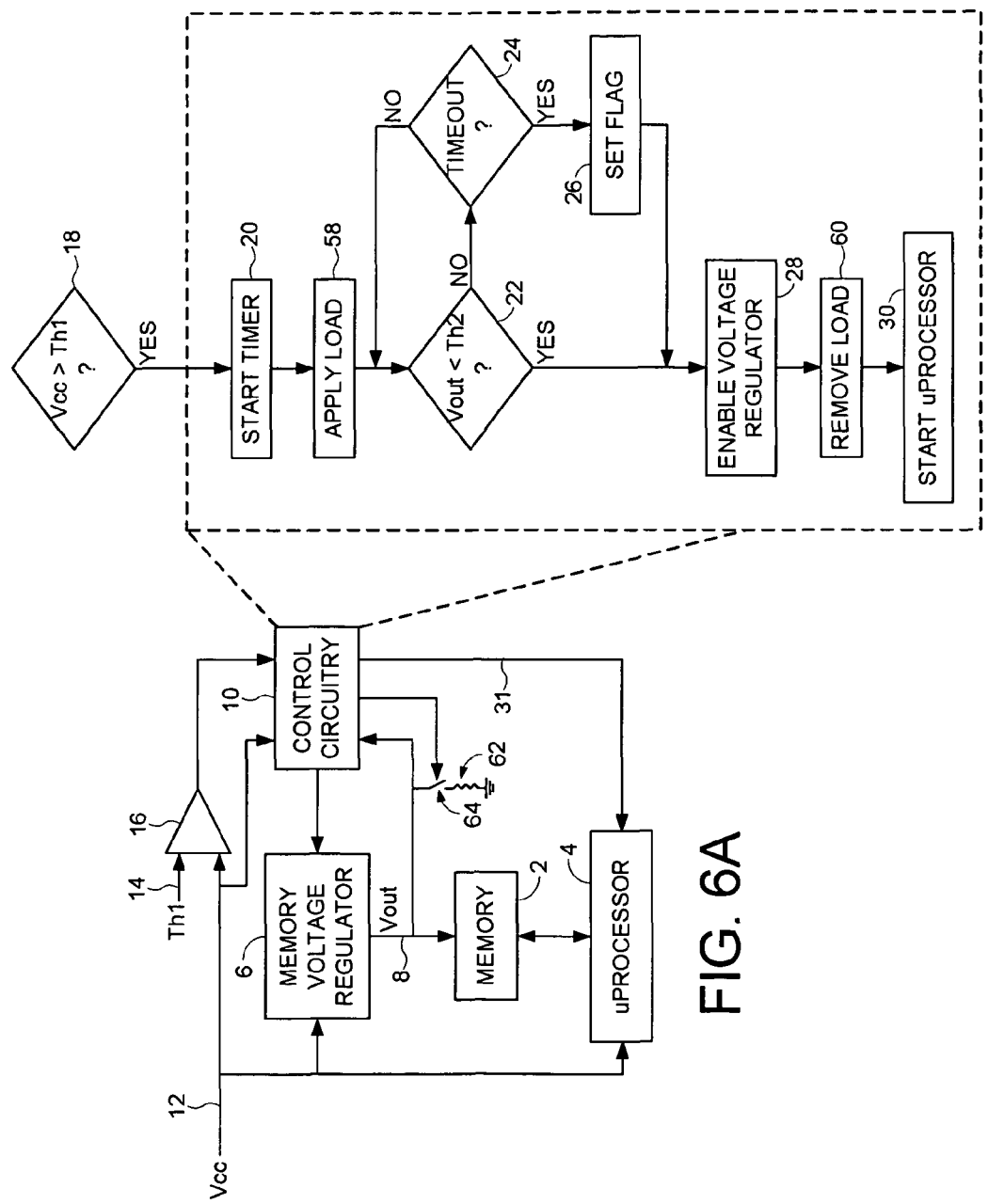
FIGS. 6A and 6B illustrate an embodiment of the present invention wherein a load is applied to the output voltage of the voltage regulator during the startup operation.

FIGS. 6A and 6B illustrate an embodiment of the present invention wherein the control circuitry 10 applies a load (step 58) to the output voltage 8 during the predetermined interval which may help pull down the output voltage 8 below the threshold (step 22). After the predetermined interval, the voltage regulator is enabled (step 28) and the load is removed (step 60). In the embodiment of FIG. 6A, the load comprises a resistor 62 that is connected to the output voltage 8 of the voltage regulator 6 through a switch 64. In one embodiment, the load is applied to the output voltage 8 constantly (not removed at step 60), for example, by hard wiring the load (e.g., a resistor) to the output voltage 8. The embodiment shown in FIG. 6A may also be used in the peripheral device from FIG. 2 or the disk drive from FIG. 3.

The control circuitry 10 may comprise any suitable circuitry for implementing the flow diagrams disclosed herein. For example, the control circuitry 10 may comprise suitable state machine circuitry for evaluating the output voltage 8 of the voltage regulator 6 and setting the flag when the output voltage 8 fails to fall below the threshold within the predetermined time interval (which may be implemented using a suitable timing circuit). The flag may be set in any suitable manner, such as turning on/off a transistor or setting/resetting a bit of a register (e.g., a D type flip-flop), wherein the flag may be active high or low.

What is claimed is:

1. A digital device comprising:
   a memory;
   a microprocessor operable to access the memory;
   a voltage regulator for ramping an output voltage supplied to the memory during a startup operation; and
   control circuitry operable to startup the digital device by:
      monitoring the output voltage;
      when the output voltage remains above a first threshold for a predetermined interval, setting a flag; and
      enabling the voltage regulator to ramp the output voltage after the predetermined interval.

2. The digital device as recited in claim 1, wherein:
   the digital device receives a supply voltage; and
   the control circuitry executes the startup operation after the supply voltage exceeds a second threshold.

3. The digital device as recited in claim 2, wherein the supply voltage is received from a host.

4. The digital device as recited in claim 3, further comprising a disk and a head actuated over the disk.

5. The digital device as recited in claim 1, wherein the control circuitry enables the microprocessor after the predetermined interval.

6. The digital device as recited in claim 5, wherein the microprocessor examines the flag to determine whether the memory started normally.

7. The digital device as recited in claim 6, wherein when the flag is set, the microprocessor executes a test procedure to determine whether the memory started normally.

8. The digital device as recited in claim 6, wherein the microprocessor notifies a host when the flag is set.

9. The digital device as recited in claim 7, wherein the microprocessor notifies a host when the test procedure fails.

10. The digital device as recited in claim 1, wherein the control circuitry is further operable to apply a load to the output voltage during the predetermined interval.

11. The digital device as recited in claim 10, wherein the control circuitry is further operable to remove the load from the output voltage after the output voltage falls below the first threshold.

12. The digital device as recited in claim 1, wherein the memory comprises a synchronous dynamic random access memory (SDRAM).

13. A method of starting a digital device, the digital device comprising a memory, a microprocessor operable to access the memory, and a voltage regulator for ramping an output voltage supplied to the memory during a startup operation, the method comprising:
   monitoring the output voltage;
   when the output voltage remains above a first threshold for a predetermined interval, setting a flag; and
   enabling the voltage regulator to ramp the output voltage after the predetermined interval.

14. The method as recited in claim 13, wherein the digital device receives a supply voltage, further comprising the step of starting the digital device after the supply voltage exceeds a second threshold.

15. The method as recited in claim 14, wherein the supply voltage is received from a host.

16. The method as recited in claim 15, wherein the digital device further comprises a disk and a head actuated over the disk.

17. The method as recited in claim 13, further comprising enabling the microprocessor after the predetermined interval.

18. The method as recited in claim 13, further comprising evaluating the flag to determine whether the memory started normally.

19. The method as recited in claim 18, wherein when the flag is set, further comprising executing a test procedure to determine whether the memory started normally.

20. The method as recited in claim 18, further comprising notifying a host when the flag is set.

21. The method as recited in claim 19, further comprising notifying a host when the test procedure fails.

22. The method as recited in claim 13, further comprising applying a load to the output voltage during the predetermined interval.

23. The method as recited in claim 22, further comprising removing the load from the output voltage after the output voltage falls below the first threshold.

24. The method as recited in claim 13, wherein the memory comprises a synchronous dynamic random access memory (SDRAM).

25. A disk drive comprising:
   a disk;
   a head actuated over the disk;
   a memory;
   a microprocessor operable to access the memory;
   a voltage regulator for ramping an output voltage supplied to the memory during a startup operation; and
   control circuitry operable to startup the disk drive by:
      monitoring the output voltage;
      when the output voltage remains above a first threshold for a predetermined interval, setting a flag; and
      enabling the voltage regulator to ramp the output voltage after the predetermined interval.

* * * * *